United States Patent [19]

Umetsu et al.

[11] Patent Number: 5,649,209

[45] Date of Patent: Jul. 15, 1997

[54] BUS COUPLING INFORMATION PROCESSING SYSTEM FOR MULTIPLE ACCESS TO SYSTEM BUS

[75] Inventors: Masakazu Umetsu, Tokyo; Masami Katagiri; Yoshihiro Hoshizawa, both of Yamagata, all of Japan

[73] Assignee: NEC Corporation, Tokyo, Japan

[21] Appl. No.: 713,289

[22] Filed: Sep. 10, 1996

Related U.S. Application Data

[63] Continuation of Ser. No. 187,542, Jan. 28, 1994, abandoned.

[30] Foreign Application Priority Data

Jan. 29, 1993 [JP] Japan ................. 5-014184

[51] Int. Cl.⁶ ........................................... G06F 12/00
[52] U.S. Cl. ................... 395/739; 395/868; 395/741; 395/306
[58] Field of Search ................... 395/868, 730, 395/739, 741, 306

[56] References Cited

U.S. PATENT DOCUMENTS

| | | | |
|---|---|---|---|
| 4,570,220 | 2/1986 | Tetrick et al. | 395/325 |
| 5,001,625 | 3/1991 | Thomas et al. | 395/325 |
| 5,191,649 | 3/1993 | Cadambi et al. | 395/200 |
| 5,539,917 | 7/1996 | Jirgal | 395/842 |
| 5,555,420 | 9/1996 | Sarangdhar et al. | 395/739 |

*Primary Examiner*—Gopal C. Ray
*Assistant Examiner*—Jeffrey K. Seto
*Attorney, Agent, or Firm*—Foley & Lardner

[57] ABSTRACT

When a first bus master device issues a bus request on a first request signal line, a centralized arbitration circuit in a system bus manage circuit issues a bus grant signal on a first grant signal line if the bus is available for use. This causes the first bus master device having gained the ownership of the bus to issue a read request to a first slave device. At this time a first signal line is designated. Even before the sending of the read data constituting a response to this read request to the first bus master device, a bus request from a second bus master device can be accepted if the data bus is unoccupied. Thus, the centralized arbitration circuit in the system bus manage circuit issues a grant signal on a second grant signal line. This causes the second bus master device having gained the ownership of the bus to designate a second end signal line, and to issue a read request to a second slave device. After that, the first end signal line is activated, and read data from the first slave device is sent to the first bus master device. On the other hand, the second end signal line is activated, and read data from the second slave device is sent to the second bus master device.

5 Claims, 4 Drawing Sheets

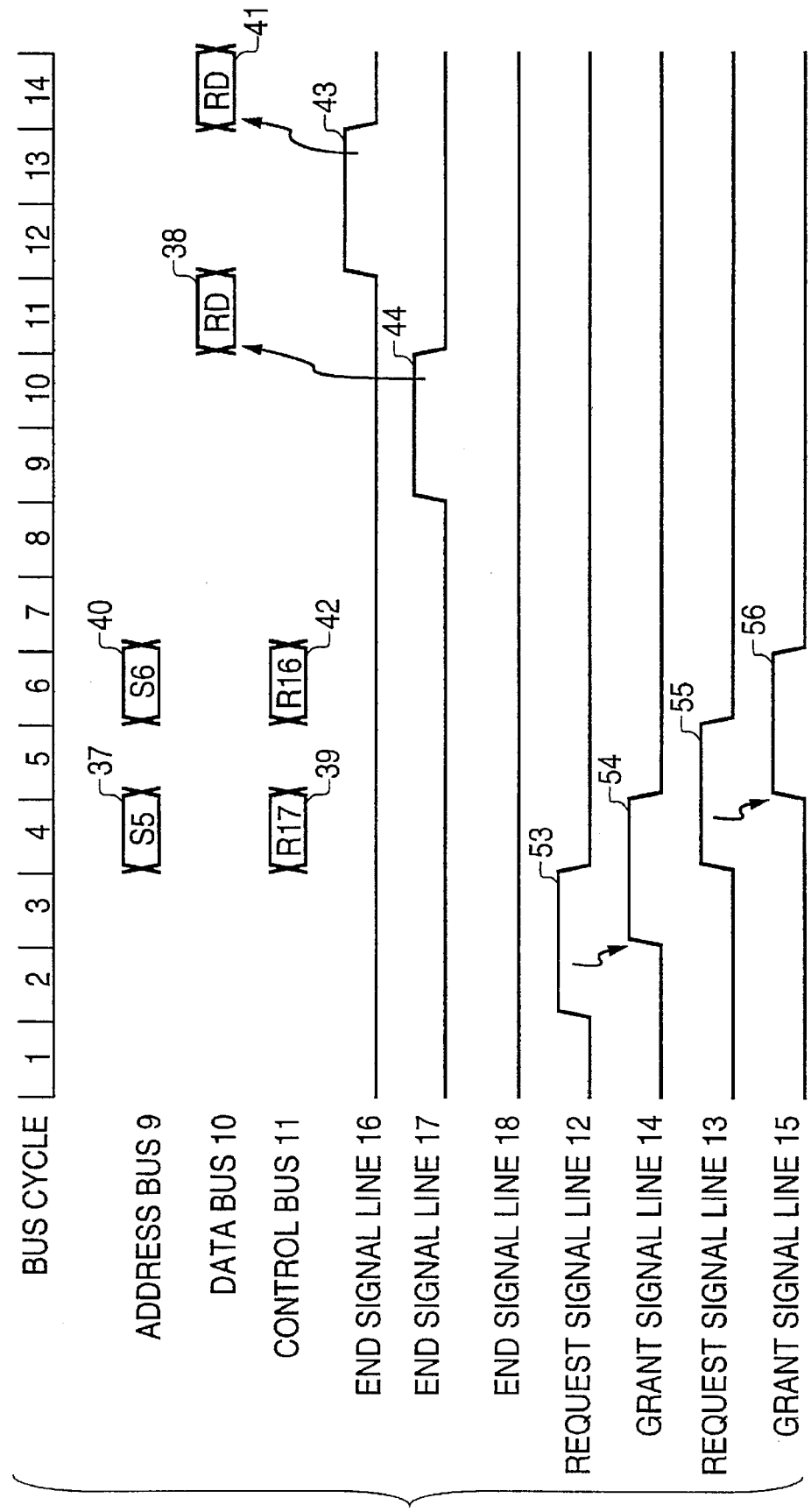

BUS COUPLING INFORMATION PROCESSING SYSTEM FOR MULTIPLE ACCESS TO SYSTEM BUS

This application is a continuation of application Ser. No. 08/187,542, filed Jan. 28, 1994, now abandoned.

BACKGROUND OF THE INVENTION

1. Field of the Invention

The present invention relates to a bus coupling information processing system for enabling a plurality of bus masters to achieve multiple access to system buses, and more particularly it is applicable to system buses slow in input/output (I/O) access, such as in personal computers.

2. Description of the Prior Art

In a bus coupling information processing system of this kind according to the prior art, a certain bus master device connected to system buses, such as a central processing unit (CPU) or a direct memory access controller (DMAC), first issues a bus request signal to the system buses when data are to be transferred to a slave device, for instance a memory or some other I/O device. Upon gaining ownership of the system buses for that bus request signal, the bus master device owns the system buses to transfer data to the slave device. This ownership continues until the completion of the data transfer. Therefore, if the slave device takes a long access time, the bus master device will exclusively own the system buses all the time until a reply comes from the slave device.

Thus, this prior art involves the problem that the system buses remain owned by a specific bus master device until a data transfer to that bus master device is completed, obliging any other access to wait all that while. There further is the problem that during this period of waiting for a reply, more specifically during the access time for the data transfer, the system buses are not actually used, resulting in inefficient use of the system buses.

An object of the present invention is to obviate the aforementioned exclusive ownership of the system bus by a specific bus master device and thereby to improve the efficiency of system bus use.

SUMMARY OF THE INVENTION

In a preferred embodiment thereof, the bus coupling information processing system according to the invention includes a group of bus master devices for issuing processing requests and, upon issuing each such request, designating a processing end identifier; a group of slave devices for performing processing according to processing requests from the group of bus master devices and issuing said processing end identifier upon completion of each such processing; system buses for coupling the group of bus master devices and that of slave devices; and system bus manage means for managing the system buses and arbitrating processing requests from said group of bus masters.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 5 is a timing chart for describing the operation at the time of read access.

DETAILED DESCRIPTION OF THE PREFERRED EMBODIMENT

A preferred embodiment of the present invention will be described below in detail with reference to the drawings.

Figure 1:
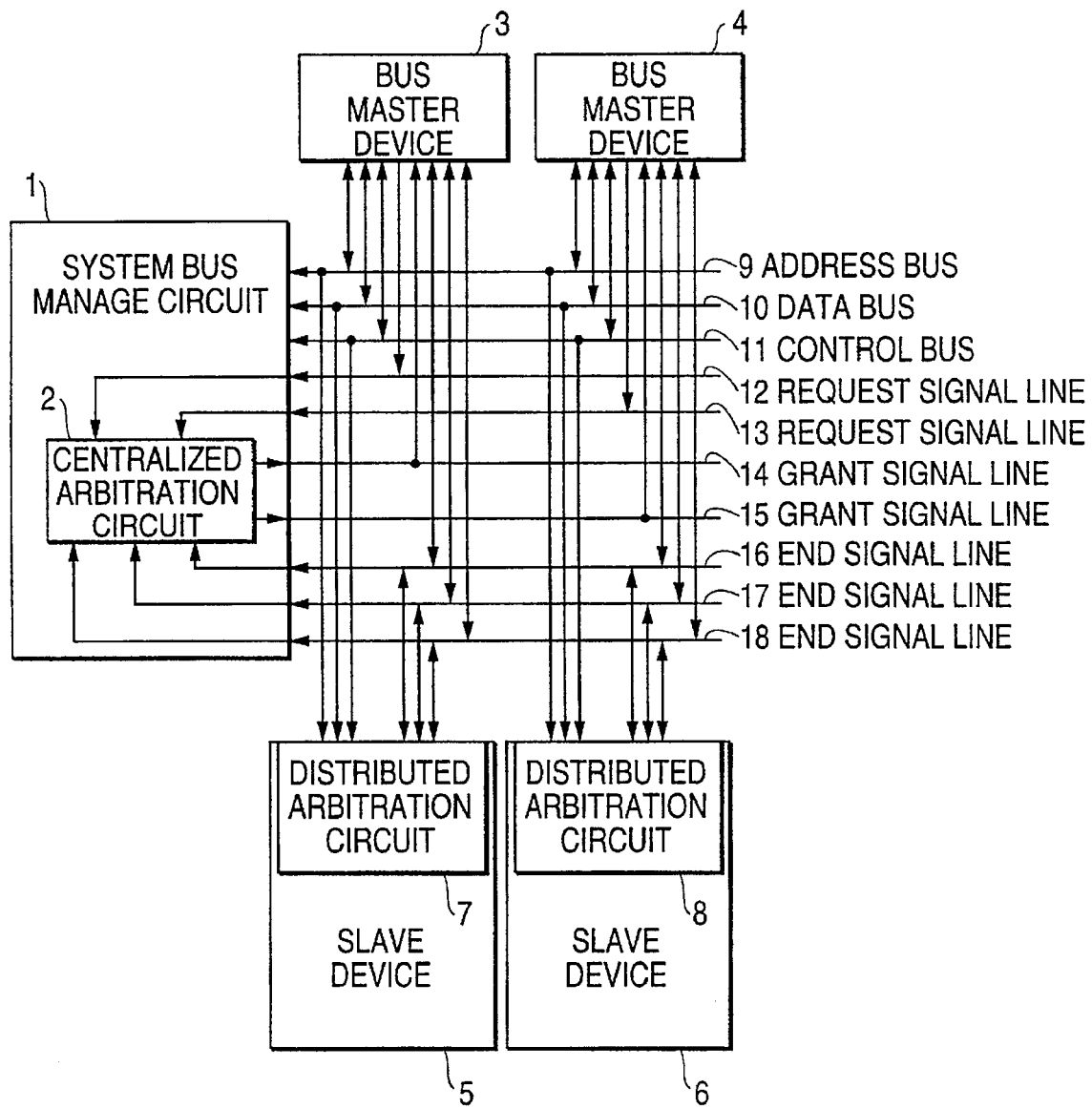
FIG. 1 is a block diagram of a bus coupling information processing system for describing a preferred embodiment of the invention.

Referring to FIG. 1, system buses to which the invention is applicable include an address bus 9 for transferring addresses, a data bus 10 for transferring data, a control bus 11 for transferring control signals, request signal lines 12 and 13 for transferring requests, grant signal lines 14 and 15 for transferring bus grant signals, and end signal lines 16, 17 and 18 for making the end timings of processing known. To these system buses are connected a system bus manage circuit 1 for managing accesses to the system buses, bus master devices 3 and 4, and slave devices 5 and 6.

The system bus manage circuit 1 monitors the states of the bus request signal lines 12 and 13 from each of the bus master devices 3 and 4. If the bus request on the bus request signal line 12 and that on the bus request signal line 13 contend with each other, only one or the other is selected. If any one of the end signals 16 to 18 from the slave devices 5 and 6 is active or if the data bus 10 is busy, no bus grant is given to either of the the bus master devices 3 and 4. The bus master devices 3 and 4 are processors having an active character, and CPU's and DMAC's, for instance, fall into this category. The slave devices 5 and 6 are processors having a passive character, and I/O devices such as memories and disk drives belong to this category. These slave devices 5 and 6 have distributed arbitration circuits 7 and 8, respectively. Each of these distributed arbitration circuits 7 and 8 monitors the end signal supplied from the other slave device, and arbitrates so that only one end signal is active. Therefore, according to the present invention, the ownerhsip of the system buses is determined by the centralized arbitration circuit 2 of the system bus manage circuit 1 and the distributed arbitration circuits 7 and 8 of the slave devices 5 and 6, respectively.

The address bus 9 transfers an address output from the bus master device 3 or 4 to the slave device 5 or 6. The data bus 10 transfers write data from the bus master device 3 or 4 to the slave device 5 or 6, and read data from the slave device 5 or 6 to the bus master device 3 or 4. The control bus 11 transfers a control signal from the bus master device 3 or 4 to the slave device 5 or 6. The request signal lines 12 and 13 transfer bus access requests from the bus master devices 3 and 4, respectively, to the system bus circuit 1. The grant signal line 14 or 15 transfers a bus grant signal from the system bus manage circuit 1 to the bus master device 3 or 4. The end signal lines 16 to 18 transfer a processing end signal from the slave device 5 or 6 to the bus master device 3 or 4. More specifically, when the write processing of write data has ended in a slave device or when reading in a slave device has ended and a transfer to a bus master device starts, the corresponding end line signal is activated. The allocation of this end line signal is made by the bus master device at the time of issuing the pertinent request. In preparation for this allocation, each bus master device monitors the end signal lines 16 to 18 to be always cognizant of which of the end signal lines is unreserved.

Figure 2:
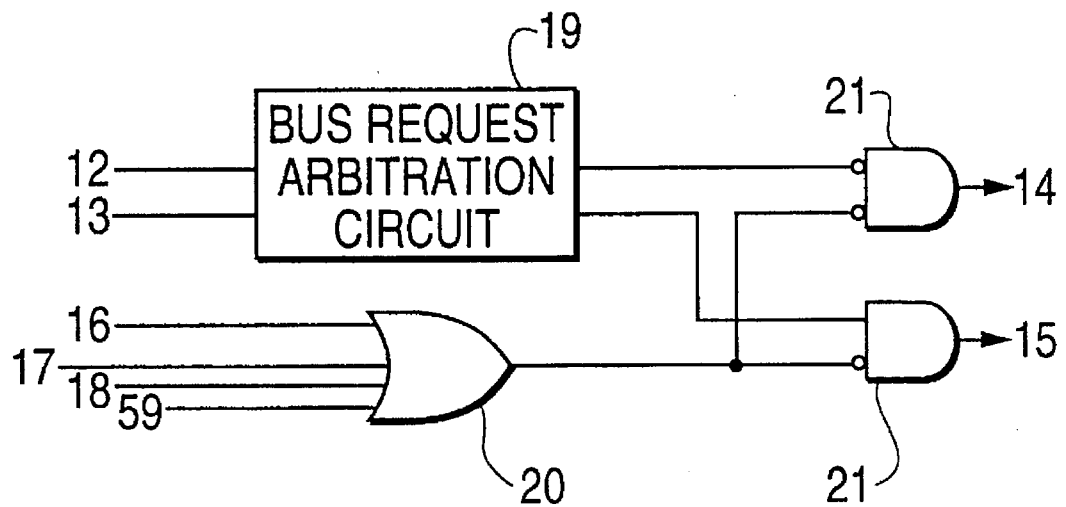
FIG. 2 is a block diagram of a centralized arbitration circuit.

Referring now to FIG. 2, the centralized arbitration circuit 2, receiving inputs from the request signal lines 12 and 13 for transferring bus requests from the bus master devices 3 and 4, from the end signal lines 16 to 18 for transferring end signals indicating the completion of processing from the slave devices 5 and 6, and a data bus busy signal 59 indicating that the data bus is in use, supplies a bus grant signal to the bus master device 3 or 4 over the grant signal line 14 or 15. The centralized arbitration circuit 2 has a bus request arbitration circuit 19, an OR gate 20, and AND gates 21 and 21'. The bus request arbitration circuit 19 receives a bus request signal from the bus request signal line 12 or 13, and arbitrates so that no more than one of the bus master devices 3 and 4 are granted ownership. Known methods for such bus arbitration include assigning priorities to individual bus master devices in a fixed manner or cyclically varying the priority of each bus master device. The bus request arbitration circuit 19 can choose any convenient one of these known bus arbitration methods.

The OR gate 20 generates the logical sum of the end signal lines 16 to 18 and the data bus busy signal line 59, and issues an active signal if an end signal is inputted to at least one of the end signal lines 16 to 18. The data bus busy signal on the data bus busy signal line 59 is generated by the monitoring of the data bus 10 by the system bus manage circuit 1. The AND gates 21 and 21' arbitrate between the bus request signal and the end signal. Thus, if any one of the end signal lines 16 to 18 is active, neither of the bus grant signals 14 and 15 are activated. The end signal is thereby given priority when it contends with a bus request signal.

Figure 3:
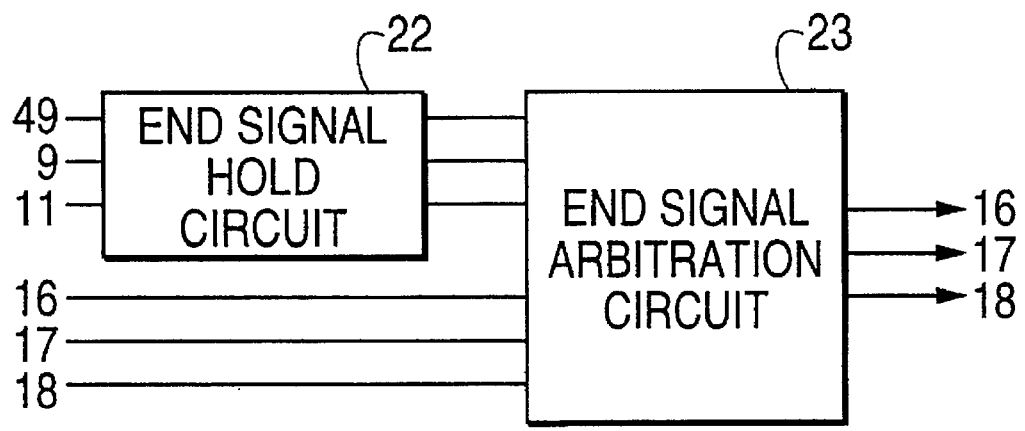
FIG. 3 is a block diagram of a distributed arbitration circuit.

Referring to FIG. 3, the distributed arbitration circuits 7 and 8 receive inputs from the address bus 9 for transferring address, from the control bus 11 for transferring control signals, a ready signal 49 indicating that processing by the pertinent slave device has been completed and an end signal is ready to be transferred, and inputs from the end signal lines 16 to 18 for transferring processing end signals, and supply the result of arbitration to the end signal lines 16 to 18. Each of the distributed arbitration circuits 7 and 8 has an end signal hold circuit 22 for temporarily holding end signals and an end signal arbitration circuit 23 for arbitrating contention between end signals. The end signal hold circuit 22, if the address of the address bus 9 identifies the pertinent slave device, holds the reference number of the end signal designated by the control signal of the control bus 11 at the time. The reference number of the held end signal is supplied to the end signal arbitration circuit 23 at the timing indicated by the ready signal 49 in that slave device. The end signal hold circuit 22, having a first-in first-out configuration, keeps the order of priority among the plurality, if any, of end signals held.

The signal arbitration circuit 23 activates one of the end signal lines 16 to 18 in accordance with the reference number of the end signal first supplied from the end signal hold circuit 22. It again receives inputs from the end signal lines 16 to 18, and arbitrates between the end signals supplied from the slave devices 5 and 6. Whereas various methods are conceivable for this arbitration, it can be done in such a fixed manner that the end signal line 16 is given the top priority, followed by the end signal line 17, with the end signal line 18 assigned the least priority.

Next will be described in detail the operation of this preferred embodiment of the present invention.

Figure 4:
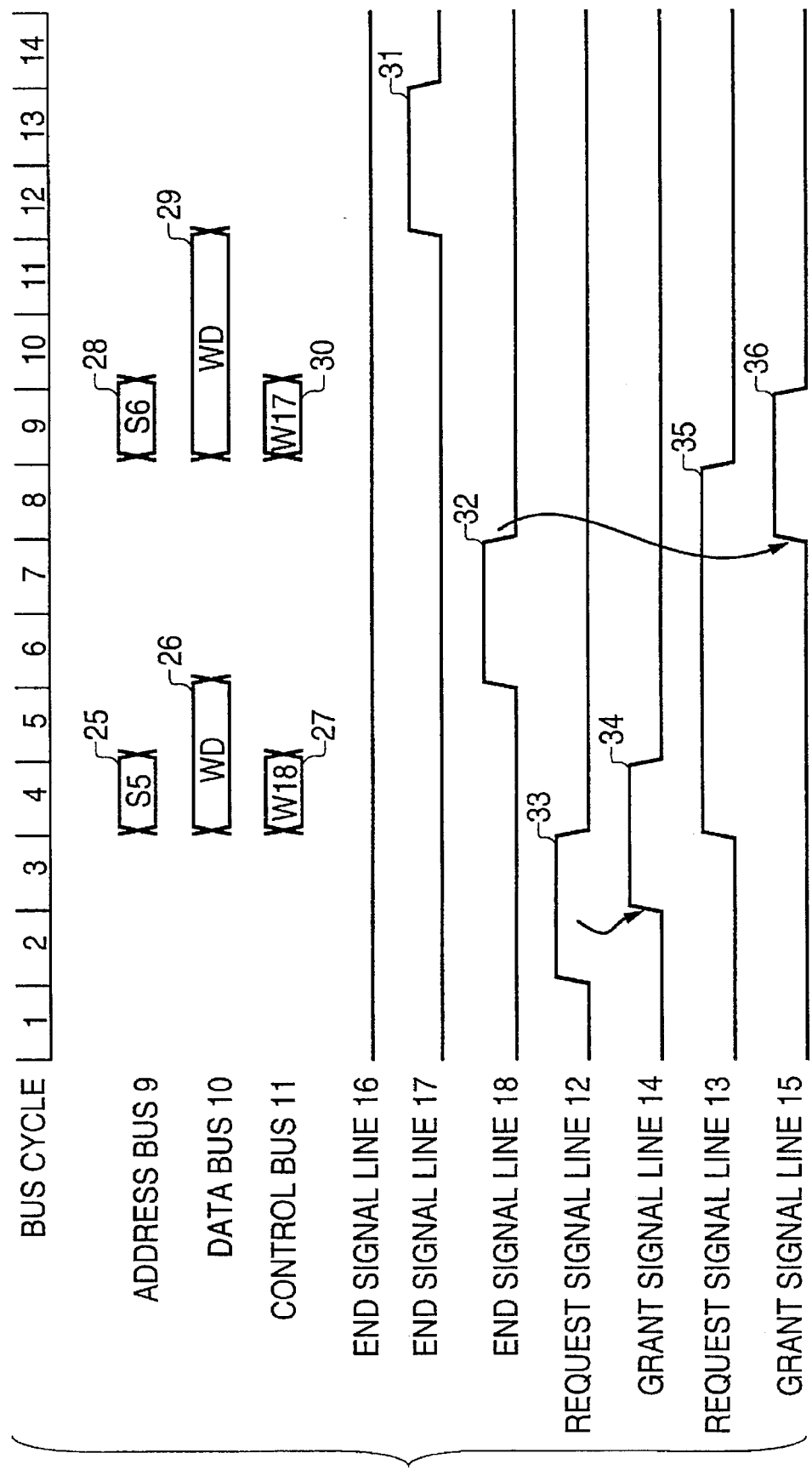
FIG. 4 is a timing chart for describing the operation at the time of write access.

FIG. 4 illustrates the operation to write data from the bus master device 3 into the slave device 5 and that to write data from the bus master device 4 into the slave device 6.

The bus cycle numbers sequentially represent the cycles which the operations of the system buses refer to.

First in cycle (2), a bus request 33 is supplied from the bus master device 3 to the request signal line 12. As there is no other bus request for this cycle (2), a bus grant signal 34 is supplied from the centralized arbitration circuit 2 in the system bus manage circuit 1 to the grant signal line 14 in cycle (3). The bus master device 3 is thereby given bus ownership.

The bus master device 3, having acquired bus ownership, gives a write cycle instruction to the slave device 5 in cycle (4). Thus it indicates by the address bus 9 that the write destination is the slave device 5 (25), and designates the write data by the data bus 10 (26). It further indicates by the control bus 11 that the pertinent request is a write request and that the end signal, notifying the end of processing, will be given to the end signal line 18 (27).

Meanwhile in cycle (4), a bus request 35 is supplied from the bus master device 4 to the request signal line 13. However, no bus grant is given because the data bus is busy and the data bus busy signal line 59 of FIG. 2 is active in cycles (4) and (5). Further in cycles (6) and (7), as the end signal line 18 is active, the bus master device 4 is given no bus grant either. Therefore, a bus grant in response to the bus request 35 from the bus master device 4 will be given in cycle (8) as will be explained below.

In cycle (6), the end signal line 18 indicating the completion of a write cycle from the bus master device 3 to the slave device 5 is activated. The distributed arbitration circuit in each slave device monitors the end signal lines 16 to 18, and performs these arbitrations. When the result of these arbitrations reveals the absence of contention, an end signal 32 from the slave device 5 continues to be held in cycle (7), and the completion of write into the slave device 5 is notified.

In cycle (8), where the end signal line 18 becomes non-active, a bus grant signal 36 is supplied from the centralized arbitration circuit 2 in the system bus manage circuit 1 to the grant signal line 15. The bus master device 4 is thereby granted bus ownership.

The bus master device 4, having acquired bus ownership, gives a write cycle instruction to the slave device 6 in cycle (9). Thus it indicates by the address bus 9 that the write destination is the slave device 6 (28), and designates the write data by the data bus 10 (29). It further indicates by the control bus 11 that the pertinent request is a write request and that the end signal, notifying the end of processing, will be given to the end signal line 17 (30).

In cycle (12), the end signal line 17 indicating the completion of a write cycle from the bus master device 4 to the slave device 6 is activated. The distributed arbitration circuit in each slave device monitors the end signal lines 16 to 18, and performs these arbitrations. When the result of these arbitrations reveals the absence of contention, an end signal 31 from the slave device 6 continues to be held in cycle (13), and the completion of write into the slave device 6 is notified.

FIG. 5 illustrates the operation to read data from the slave device 5 into the bus master device 3 and that to read data from the slave device 6 into the bus master device 4.

First in cycle (2), a bus request 53 is supplied from the bus master device 3 to the request signal line 12. As there is no other bus request for this cycle (2), a bus grant signal 54 is supplied from the centralized arbitration circuit 2 in the system bus manage circuit 1 to the grant signal line 14 in cycle (3). The bus master device 3 is thereby given bus ownership.

The bus master device 3, having acquired bus ownership, gives a read cycle instruction to the slave device 5 in cycle (4). Thus it indicates by the address bus 9 that the read source is the slave device 5 (37). It further indicates by the control bus 11 that the pertinent request is a read request and that the end signal, notifying the end of processing, will be given to the end signal line 17 (39).

Meanwhile in cycle (4), a bus request 55 is supplied from the bus master device 4 to the request signal line 13. As there is no other bus request for this cycle (4), a bus grant signal 56 is supplied from the centralized arbitration circuit 2 in the system bus manage circuit 1 to the grant signal line 15 in cycle (5). The bus master device 4 is thereby given bus ownership.

The bus master device 4, having acquired bus ownership, gives a read cycle instruction to the slave device 6 in cycle (6). Thus it indicates by the address bus 9 that the read source is the slave device 6 (40). It further indicates by the control bus 11 that the pertinent request is a read request and that the end signal, notifying the end of processing, will be given to the end signal line 16 (42). Thus, before the completion of the read request from the bus master device 3, a read request from the bus master device 4 can be indicated.

In cycle (9, the end signal line 17 indicating the sending of read data, which is a response to the read request from the bus master device 3 to the slave device 5 is activated. The distributed arbitration circuit in each slave device monitors the end signal lines 16 to 18, and performs these arbitrations. When the result of these arbitrations reveals the absence of contention, an end signal 44 from the slave device 5 continues to be held in cycle (10). It is thereby notified that read data from the slave device 5 will be sent into the next cycle, i.e. cycle (11).

In cycle (12) the end signal line 16 indicating the sending of read data is activated, which is a response to the read request from the bus master device 4 to the slave device 6. The distributed arbitration circuit in each slave device monitors the end signal lines 16 to 18, and performs these arbitrations. When the result of these arbitrations reveals the absence of contention, an end signal 43 from the slave device 6 continues to be held in cycle (13). It is thereby notified that read data from the slave device 6 will be sent into the next cycle, i.e. cycle (14).

Along with the notification of these end signals 44 and 43, read data 38 and 41 are respectively transferred in cycles (11) and (14) to the bus master devices 3 and 4 via the data bus 10.

Although this preferred embodiment uses two each of bus master devices and slave devices, the present invention is not limited to this configuration. Furthermore, though the invention is applicable to systems of slow I/O access, such as personal computers, its applicability is not restricted thereto.

As is evident from the foregoing description, according to the invention, when a request is issued from a bus master device via a system bus, another request can be issued via the same system bus from the bus master device before the processing of the first request is completed. The efficiency of the use of system buses can be thereby improved. This effect is particularly significant for system buses to which a plurality of slow-access slave devices are connected.

What is claimed is:

1. A bus coupling information processing system, comprising:
    bus master devices for issuing processing requests;
    slave devices for performing processing according to said processing requests;
    system buses, including a data bus for transferring data and end signal lines indicating end of processing at said slave devices, for coupling said bus master devices to said slave devices; and
    system bus manage means for managing said system buses and arbitrating said processing requests from said bus master devices,
        wherein each bus master device, when issuing a processing request to one of said slave devices, selectively designates one of said end signal lines as a designated end signal line, and said slave device, upon completion of processing according to said processing request, activates said designated end signal line when no other end signal line is active,
        wherein each slave device includes a distributed arbitration section for monitoring status of said end signal lines and for arbitrating said end signal lines so that only one end signal line is active, and
        wherein said system bus manage means includes a centralized arbitration section for arbitrating said processing requests from said bus master devices and granting a processing request when said data bus is not busy and no end signal lines are active.

2. A bus coupling information processing system as recited in claim 1, wherein said processing requests are read requests and said slave devices perform read processing according to said read requests.

3. A bus coupling information processing system as recited in claim 2,
    wherein said bus master devices include first and second bus master devices and said slave devices include first and second slave devices,
    wherein said first and second bus master devices sequentially issue first and second read requests to first and second slave devices, respectively, and
    wherein, before a read processing is completed at said first slave device, a read processing is initiated at said second slave device.

4. A bus coupling information processing system as recited in claim 1, wherein said system buses further include an address bus for transferring addresses, a control bus for transferring control signals, request signal lines for transferring said processing requests from said bus master devices, and grant signal lines for transferring bus grant signals from said system bus manage means.

5. A bus coupling information processing system as recited in claim 4, wherein said centralized arbitration section includes:
    a bus request arbitration circuit configured to receive said processing requests from each of said bus master devices and to output an indication of which of said bus master devices to be given ownership of the system buses when more than one of said processing requests are received at one time;
    an OR Gate for generating a first signal as a result of a logical sum of said end signal lines and a data bus busy signal line;
    a first AND Gate for generating a second signal on one of said grant signal lines, said second signal being produced from a logical AND of said indication from said bus request arbitration circuit and an inverted signal of said first signal; and
    a second AND Gate for generating a third signal on another of said grant signal lines, said third signal being produced from a logical AND of an inverted signal of said indication from said bus request arbitration circuit and said inverted signal of said first signal.

* * * * *